US007749399B2

(12) United States Patent
Stebani et al.

(10) Patent No.: US 7,749,399 B2
(45) Date of Patent: Jul. 6, 2010

(54) METHOD FOR PRODUCING FLEXOGRAPHIC PRINTING PLATES USING DIRECT LASER ENGRAVING

(75) Inventors: Uwe Stebani, Flörsheim-Dalsheim (DE); Jens Schadebrodt, Mainz (DE)

(73) Assignee: XSYS Print Solutions Deutschland GmbH, Stuttgart (DE)

( * ) Notice: Subject to any disclaimer, the term of this patent is extended or adjusted under 35 U.S.C. 154(b) by 846 days.

(21) Appl. No.: 11/596,945

(22) PCT Filed: May 18, 2005

(86) PCT No.: PCT/EP2005/005398

§ 371 (c)(1),
(2), (4) Date: Nov. 17, 2006

(87) PCT Pub. No.: WO2005/113240

PCT Pub. Date: Dec. 1, 2005

(65) Prior Publication Data

US 2008/0061036 A1 Mar. 13, 2008

(30) Foreign Application Priority Data

May 19, 2004 (DE) ....................... 10 2004 025 364

(51) Int. Cl.

| | |
|---|---|
| ***B44C 1/22*** | (2006.01) |
| ***C03C 15/00*** | (2006.01) |
| ***C03C 25/68*** | (2006.01) |
| ***C23F 1/00*** | (2006.01) |

(52) U.S. Cl. ...................................... 216/65; 430/270.1

(58) Field of Classification Search ................... 216/65; 430/270.1

See application file for complete search history.

(56) References Cited

U.S. PATENT DOCUMENTS

| | | | | |
|---|---|---|---|---|
| 5,176,986 | A | 1/1993 | Telser et al. | |
| 5,259,311 | A | 11/1993 | McCaughey, Jr. | |
| 6,368,777 | B1 * | 4/2002 | Obuchowicz | 430/331 |
| 6,494,965 | B1 | 12/2002 | Walker et al. | |
| 6,544,348 | B1 * | 4/2003 | Stockigt et al. | 134/40 |
| 6,776,095 | B2 | 8/2004 | Telser et al. | |
| 6,880,461 | B2 | 4/2005 | Hiller et al. | |
| 6,935,236 | B2 | 8/2005 | Hiller et al. | |
| 7,101,653 | B2 | 9/2006 | Kaczun et al. | |
| 2002/0104454 | A1 * | 8/2002 | Verschueren | 101/450.1 |
| 2004/0259022 | A1 | 12/2004 | Hiller et al. | |
| 2005/0166779 | A1 | 8/2005 | Hiller | |

FOREIGN PATENT DOCUMENTS

| | | |
|---|---|---|
| EP | 1162315 | 12/2001 |

(Continued)

OTHER PUBLICATIONS

English translation of International Search Report on Patentability, issued Nov. 29, 2006.

*Primary Examiner*—Roberts Culbert
(74) *Attorney, Agent, or Firm*—Connolly Bove Lodge & Hutz LLP

(57) ABSTRACT

Process for the production of flexographic printing plates by means of direct laser engraving by engraving a print relief in the relief-forming layer with the aid of a laser and cleaning the resulting printing plate with a liquid cleaning agent.

15 Claims, 3 Drawing Sheets

FOREIGN PATENT DOCUMENTS

Figure 1:
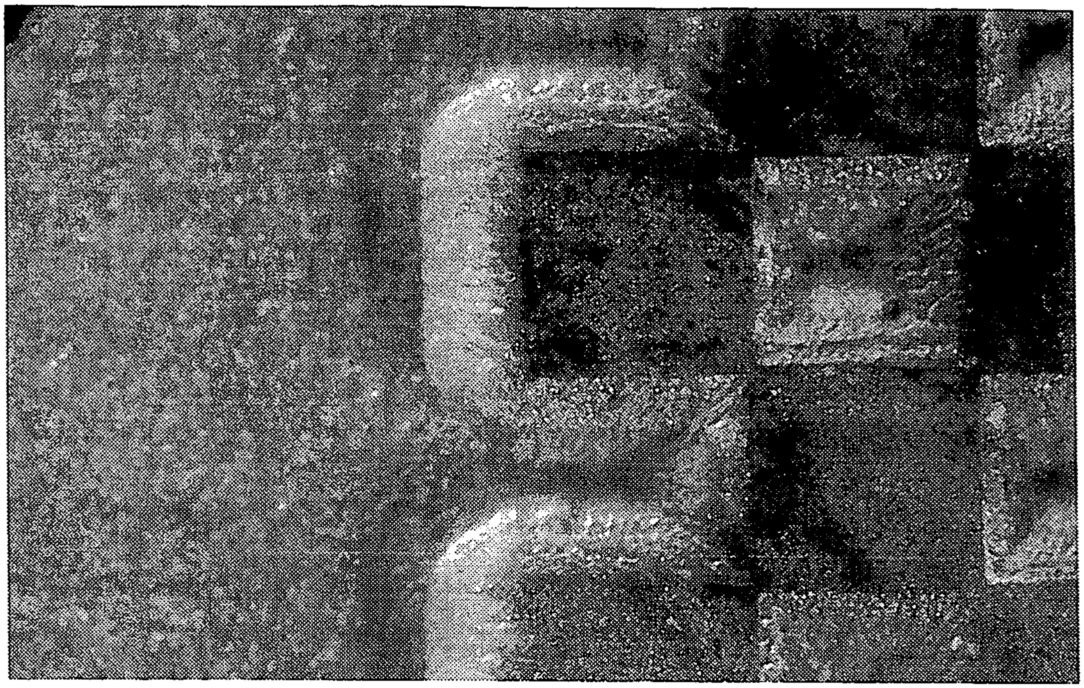

| | | | |
|---|---|---|---|
| EP | 1162316 | | 12/2001 |
| JP | 10010744 A | * | 1/1998 |
| WO | WO-90/11344 | | 10/1990 |
| WO | WO-93/23252 | | 11/1993 |
| WO | WO-99/62723 | | 12/1999 |
| WO | WO-02/76739 | | 3/2002 |
| WO | WO-02/49842 | | 6/2002 |
| WO | WO-02/083418 | | 10/2002 |
| WO | WO-03/045693 | | 6/2003 |
| WO | WO-03/106172 | | 12/2003 |
| WO | WO-03/107092 | | 12/2003 |

* cited by examiner

METHOD FOR PRODUCING FLEXOGRAPHIC PRINTING PLATES USING DIRECT LASER ENGRAVING

RELATED APPLICATIONS

This application is a national stage application (under 35 U.S.C. 371) of PCT/EP2005/005398 filed May 18, 2005, which claims benefit of German application 10 2004 025 364.1 filed May 19, 2004.

The invention relates to a process for the production of flexographic printing plates by means of direct laser engraving by engraving a printing relief in the relief-forming layer with the aid of a laser and cleaning the resulting printing plate with a liquid cleaning agent.

In direct laser engraving for the production of flexographic printing plates, a printing relief is engraved by means of a laser directly into the relief-forming layer of a flexographic printing element. A subsequent development step, as in the conventional process for the production of flexographic printing plates, is no longer necessary. The production of flexographic printing plates by means of direct laser engraving is known in principle, for example from U.S. Pat. No. 5,259,311, WO 93/23252, WO 02/49842, WO 02/76739 or WO 02/83418.

In direct laser engraving, the relief-forming layer absorbs laser radiation to such an extent that it is removed or at least detached in those parts where it is exposed to a laser beam of sufficient intensity. Under the influence of the laser radiation, the material of the relief-forming layer is on the one hand vaporized and on the other hand split into more or less large fragments. This results, inter alia, in tacky, organic aerosols having a particle diameter of, usually, 1 μm and also volatile organic substances and may result in dusts. In particular, powerful IR lasers, such as, for example, $CO_2$ lasers or Nd-YAG lasers, are customary for engraving. Suitable apparatuses for engraving a flexographic printing plate are disclosed, for example, in EP 1 162 315 and EP 1 162 316.

Typical relief layer thicknesses of flexographic printing plates are usually from 0.4 to 7 mm. The nonprinting wells in the relief are in the screen range of at least 0.03 mm and substantially more in the case of other negative elements and may assume values of up to 3 mm in the case of thick plates. At an engraving depth of only 0.7 mm and on average 70% ablation, about 500 g of material are ablated per $m^2$ of the printing plate. In direct laser engraving, large amounts of material are therefore removed by means of the laser.

Apparatuses for direct laser engraving have suitable extraction apparatuses for picking up the degradation products. In addition to the avoidance of contamination of the environment with degradation products, the extraction apparatuses should also prevent the very tacky aerosols formed in the course of the engraving from being deposited again on the printing surface of the plate. The redeposition of aerosols on the surface is very undesirable since the quality of the printing relief is reduced thereby and accordingly the printed image may deteriorate substantially during printing. This effect is of course all the more noticeable the finer the respective relief elements.

Even in the case of very good extraction, however, redeposition of degradation products on the surface cannot always be completely prevented. This applies in particular when engraving is effected very rapidly, which is entirely desirable for economic reasons.

It has therefore been proposed to clean the surface of laser-engraved flexographic printing plates with liquid cleaning agents after the laser engraving. WO 03/45693, WO 03/106172 or WO 03/107092 propose using for this purpose conventional washout agents for photosensitive flexographic printing elements. As a rule, such washout agents have a good cleaning effect with respect to the degradation products of the layer which are produced per laser engraving.

However, the use of conventional cleaning agents has the disadvantage that the printing plates swell in the cleaning agent. After the cleaning, the printing plate therefore cannot be used immediately for printing but must be carefully dried again prior to use. This usually takes from 2 to 3 hours and is highly undesirable since it eliminates the time benefit of direct laser engraving in comparison with the conventional production of flexographic printing plates.

The publications cited have therefore also proposed using substantially aqueous cleaning agents, the water-in-oil emulsions disclosed in EP-A 463 016 or the microemulsion cleaning agents disclosed in WO 99/62723 and comprising water, alkyl esters of saturated and unsaturated fatty acids and surfactants. However, these do not always have the desired cleaning effect. In addition, some components of substantially aqueous cleaning agents, such as, for example, long-chain fatty acid alkyl esters, also tend to swell flexographic printing plates.

It was an object of the invention to provide a process for the production of flexographic printing plates by means of direct laser engraving, in which a liquid cleaning agent is used for cleaning the engraved layer, which cleaning agent achieves a very good cleaning effect but the relief layer nevertheless does not swell excessively therein.

Accordingly, a process for the production of flexographic printing plates by means of direct laser engraving was found, in which the starting material used is a laser-engravable flexographic printing element, at least comprising a dimensionally stable substrate and an elastomeric, relief-forming layer having a thickness of at least 0.2 mm, the process comprising at least the following steps:

(1) engraving of a printing relief in the relief-forming layer with the aid of a laser, the height of the relief elements to be engraved by means of the laser being at least 0.03 mm, and (2) cleaning of the resulting printing plate by means of a liquid cleaning agent, wherein the cleaning agent comprises at least 50% by weight, based on the amount of all components of the cleaning agent, of one or more components (A) selected from the group consisting of (A1) lactones having 5, 6 or 7-membered rings, (A2) hydroxymonocarboxylic esters of the general formula $R^1$—COO—$R^2$, where $R^1$ and $R^2$, independently of one another, are a linear or branched alkyl, aralkyl, aryl or alkylaryl radical having 1 to 12 carbon atoms and at least one of the radicals $R^1$ or $R^2$ is substituted by at least one OH group, with the proviso that the esters have 5 to 20 carbon atoms, (A3) alkoxymonocarboxylic esters of the general formula $R^3$—COO—$R^4$, where $R^3$ and $R^4$, independently of one another, are a linear or branched alkyl, aralkyl or alkylaryl radical having 1 to 12 carbon atoms, and in which one or more, nonneighboring, nonterminal aliphatic carbon atoms in at least one of the radicals are replaced by an oxygen atom and the remainder can also have a terminal OH group, with the proviso that the esters have 5 to 20 carbon atoms, (A4) ketomonocarboxylic esters of the general formula $R^5$—COO—$R^6$, where $R^5$ and $R^6$, independently of one another, are a linear or branched alkyl, aralkyl or alkylaryl radical having 1 to 12 carbon atoms, and in which one or more, nonneighboring, nonterminal aliphatic carbon atoms in at least one of the radicals are replaced by a keto group >C=O, with the proviso that the esters have 5 to 20 carbon atoms, (A5) dicarboxylic esters of the general formula $R^7OOC—R^8—COOR^{7'}$ and/or $R^7COO—R^8—OOCR^{7'}$, where $R^7$ and $R^{7'}$, independently of one another, are linear or branched alkyl radicals having 1 to 4 carbon atoms and $R^4$ is a divalent hydrocarbon radical having 2 to 12 carbon atoms, with the proviso that the esters have 6 to 20 carbon atoms, and where the radicals $R^7$ or $R^{7'}$ and $R^8$ can, if appropriate, also have further substituents selected from the group consisting of F, Cl, Br, OH or =O and/or nonneighboring carbon atoms in the radicals may optionally be replaced by oxygen atoms, (A6) ether alcohols of the general formula $R^9O—(—R^{10}—O)_nH$, where n is a natural number from 2 to 5, $R^9$ is H or a straight-chain or branched alkyl radical having 1 to 6 carbon atoms and $R^{10}$ are identical or different alkylene radicals having 2 to 4 carbon atoms, with the proviso that the components (A1) to (A6) each have a boiling point in the range from 150° C. to 300° C.

Regarding the invention, the following may be stated specifically:

The starting material used for carrying out the process according to the invention is a laser-engravable flexographic printing element which comprises, in a manner known in principle, at least one dimensionally stable substrate and an elastomeric, relief-forming layer having a thickness of at least 0.2 mm, preferably at least 0.3 mm and particularly preferably at least 0.5 mm. As a rule, the thickness is from 0.5 to 3.0 mm.

The dimensionally stable substrate may be, in a manner known in principle, polymer films or metal foils, or cylindrical sleeves of metals or polymeric materials. The latter serve for the production of round printing plates, also referred to as sleeves.

The relief-forming layer can be obtained in a manner known in principle by crosslinking of a crosslinkable layer which comprises at least one elastomeric binder and components suitable for crosslinking, for example ethylenically unsaturated monomers and suitable initiators. The crosslinking can be carried out, for example, photochemically. Furthermore, absorbers for laser radiation, such as, for example, carbon black, and/or plasticizers and other assistants, such as dyes, dispersants or the like, can optionally be used.

Laser-engravable flexographic printing elements are known in principle. Laser-engravable flexographic printing elements may comprise only one relief-forming layer or a plurality thereof having an identical, similar or different structure. Details on the structure and on the composition of laser-engravable flexographic printing elements are disclosed, for example, in WO 93/23252, WO 93/23253, U.S. Pat. No. 5,259,311, WO 02/49842, WO 02/76739 or WO 02/83418, which is hereby incorporated by reference.

The process according to the invention is not limited to the use of very specific flexographic printing elements as starting materials. However, the advantages of the process are displayed very particularly in the case of those laser-engravable flexographic printing elements whose relief-forming layer comprises substantially hydrophobic binders in a manner known in principle. Examples of such elastomeric binders include natural rubber, polybutadiene, polyisoprene, polychloroprene, styrene/butadiene rubber, nitrile/butadiene rubber, acrylate/butadiene rubber, butyl rubber, styrene/isoprene rubber, polynorbornene rubber, polyoctenamer, ethylene/propylene/diene rubber (EPDM) or thermoplastic elastomeric block copolymers of the styrene/butadiene or styrene/isoprene type, such as, for example, SBS or SIS block copolymers or star-like styrene/butadiene and/or styrene/isoprene block copolymers.

Binders of the styrene/butadiene type in combination with relatively large amounts of a suitable plasticizer, as disclosed, for example, in WO 03/106172, are particularly preferred.

In process step (1) of the process according to the invention, a printing relief is engraved into the laser-engravable layer in a manner known in principle with the aid of a laser. It may be in particular an IR laser, for example a $CO_2$ or Nd/YAG laser. It may be an apparatus which operates only with one laser beam or with a plurality of laser beams. It is preferably an apparatus having a rotating cylinder. Such apparatuses are known in principle. Their design and their mode of operation are described, for example, in EP-A 1 262 315, EP-A 1 262 316 or WO 97/19783. Details are described in particular in EP-A 1 262 315, pages 14 to 17.

The height of the elements to be engraved depends on the total thickness of the relief and on the type of elements to be engraved and is determined by a person skilled in the art according to the desired properties of the printing plate. The height of the relief elements to be engraved is at least 0.03 mm, preferably at least 0.05 mm—the minimum height between individual dots is mentioned here. Printing plates having insufficient relief heights are as a rule unsuitable for printing by means of the flexographic printing technique because the negative elements fill up with printing ink. Individual negative dots should usually have greater depths; for those of 0.2 mm diameter, a depth of at least 0.07 to 0.08 mm is usually advisable. In areas which have been engraved away, a depth of more than 0.15 mm, preferably more than 0.3 mm and particularly preferably more than 0.4 mm is advisable. The latter is of course possible only in the case of a correspondingly thick relief.

The degradation or decomposition products of the relief-forming layer should be extracted by suction as well as possible during the engraving of the relief. For this purpose, the apparatus described in our still unpublished Application DE 103 55 991.4 may very particularly advantageously be used for the extraction by suction. However, other extraction apparatuses can of course also be used.

After the engraving of the relief layer, the printing plate obtained or the surface thereof is cleaned in process step (2) using a liquid cleaning agent.

According to the invention, the cleaning agent comprises at least 50% by weight of one or more components (A), the amount being based on the sum of all components of the cleaning agent. The components are one or more components selected from the group consisting of the components (A1) to (A6).

The component (A1) is a lactone having 5-, 6-, 7-membered ring which may optionally also be further substituted, for example by OH groups. It is preferably γ-butyrolactone, γ-valerolactone or γ-caprolactone.

The component (A2) is a hydroxymonocarboxylic ester of the general formula $R^1—COO—R^2$. Here, $R^1$ and $R^2$, independently of one another, are a linear or branched alkyl, aralkyl, aryl or alkylaryl radical having 1 to 12 carbon atoms, at least one of the radicals $R^1$ and/or $R^2$ having at least one additional OH group. Furthermore, the total number of all carbon atoms of the hydroxymonocarboxylic esters is from 5 to 20.

Examples of linear or branched alkyl radicals include methyl, ethyl, 1-proypyl, 2-propyl, 1-butyl, 2-butyl, tert-butyl, 1-pentyl, 1-hexyl, 2-ethyl-1-hexyl, 1-octyl, 1-decyl or 1-dodecyl groups. Linear alkyl groups are preferred.

In a known manner, aralkyl groups are alkyl groups substituted by aryl groups. Examples include a benzyl or phenylethyl group. An aryl radical may be, for example, a phenyl group. In a known manner, alkylaryl radicals are alkyl-substituted aryl radicals. For example, they may be a 4-alkylphenyl radical, in particular a 4-methylphenyl radical.

$R^1$ and $R^2$, independently of one another, are preferably linear or branched alkyl radicals having 1 to 6 carbon atoms.

The number of OH groups is chosen by a person skilled in the art according to the desired properties of the cleaning agent. Usually, the components (A2) have 1 to 4 OH groups, preferably 1 or 2 OH groups and particularly preferably one OH group.

The components (A2) are preferably hydroxymonocarboxylic esters whose radicals $R^1$ and $R^2$ are alkyl groups, particularly preferably linear alkyl groups. The OH groups may be arranged both vicinally and terminally on the alkyl group. The OH groups are preferably arranged terminally or in the α-position.

Examples of suitable hydroxymonocarboxylic esters include in particular esters of lactic acid $H_3CCH(OH)—COOR^{2'}$, $R^{2'}$ being a straight-chain or branched alkyl group having 2 to 6 carbon atoms, and esters of the general formula $R^1COOCH_2CH_2OH$. Further examples include glycolic esters $HO—CH_2COOR^{2'}$ or 3-hydroxybutyric esters $CH_3—CH(OH)CH_2COOR^{2'}$, in particular the respective ethyl esters.

Component (A3) comprises alkoxymonocarboxylic esters of the general formula $R^3—COO—R^4$. Here, $R^3$ and $R^4$, independently of one another, are a linear or branched alkyl, aralkyl or alkylaryl radical having 1 to 12 carbon atoms, one or more nonneighboring, nonterminal aliphatic carbon atoms in at least one of the radicals being replaced by oxygen atoms. In other words, the radicals have one or more ether groups. The total number of all carbon atoms of the alkoxymonocarboxylic esters is from 5 to 20.

The term “nonterminal” relates to the respective radical alone, i.e. neither a terminal aliphatic carbon atom nor the aliphatic carbon atom bonded directly to the ester group should be substituted by oxygen.

The number of ether groups is chosen by a person skilled in the art according to the desired properties of the cleaning agent. Usually, however, the components (A3) have not more than 4 ether groups, preferably 1 to 3 and particularly preferably 1 or 2. If a plurality of ether groups are present in a radical, they are preferably separated from one another by at least 2 carbon atoms.

The radicals having ether groups may also have a terminal OH group.

Preferably, only one of the two radicals $R^3$ or $R^4$ has ether groups, this particularly preferably being $R^4$.

Examples of suitable alkoxymonocarboxylic esters include 2-ethoxyethyl acetate or 2-butoxyethyl acetate.

In a further preferred embodiment of the invention, $R^4$ is a polyoxyalkylene group which is obtainable, in a manner known in principle, by alkoxylation of a carboxylic acid $R^3COOH$ with ethylene oxide and/or propylene oxide and/or butylene oxide. The terminal OH group may also be etherified, for example to give a methoxy, ethoxy, propoxy or butoxy group.

Examples of suitable components (A3) having polyoxyalkylene groups include compounds of the general formula $R^3COO—(CH_2CH_2O)_kH$, $R^3COO—(CH_2CH_2O)_kCH_3$, $R^3COO—(CH_2CH(CH)_3O)_kH$ or $—(CH_2CH(CH)_3O)_kCH_3$, where n is 2 or 3 and $R^3$ is a straight-chain or branched alkyl radical having 2 to 6 carbon atoms.

Component (A4) is a ketomonocarboxylic ester of the general formula $R^5—COO—R^6$. Here, $R^5$ and $R^6$, independently of one another, are a linear or branched alkyl, aralkyl or alkylaryl radical having 1 to 12 carbon atoms, one or more nonneighboring, nonterminal aliphatic carbon atoms in at least one of the radicals being replaced by a keto group >C═O. Furthermore, the total number of all carbon atoms of the ketomonocarboxylic esters is from 5 to 20.

The number of keto groups is chosen by a person skilled in the art according to the desired properties of the cleaning agent. Usually, however, the components (A4) have not more than 4 keto groups, preferably 1 or 2 keto groups and particularly preferably only one keto group.

The component (A4) is preferably a ketoester of the general formula $R^{5'}—CO—CH_2—COOR^6$, where $R^{5'}$ is a linear or branched alkyl, aralkyl or alkylaryl radical having 1 to 10 carbon atoms, preferably a linear or branched alkyl radical having 1 to 6 carbon atoms. $R^{5'}$ is particularly preferably a methyl group. In the preferred compound, $R^6$ is a linear or branched alkyl radical having 1 to 6 carbon atoms, for example an ethyl group.

(A5) is a dicarboxylic ester of the general formula $R^7OOC—R^8—COOR^{7'}$ and/or $R^7COO—R^8—OOCR^{7'}$. Here, $R^7$ and $R^{7'}$, independently of one another, are linear or branched alkyl radicals having 1 to 4 carbon atoms and $R^4$ is a divalent hydrocarbon radical having 2 to 12 carbon atoms. In other words, they are diesters which are derived either from dicarboxylic acids or from dialcohols. The total number of all carbon atoms of the dicarboxylic esters is from 6 to 20.

Here, $R^7$ and $R^{7'}$, independently of one another, are linear or branched alkyl radicals having 1 to 4 carbon atoms. Examples include methyl, ethyl, 1-propyl-, 2-propyl-, 1-butyl-, 2-butyl or tert-butyl radicals. Methyl, ethyl and 1-propyl radicals are preferred and methyl radicals are particularly preferred.

$R^8$ is a divalent hydrocarbon radical having 2 to 12 carbon atoms. It may be either a linear, branched or cyclic, aliphatic hydrocarbon radical or an aromatic radical. It is preferably a divalent, linear alkylene radical having 2 to 12 carbon atoms, preferably 2 to 6 carbon atoms.

Examples of suitable diesters include dimethyl butanedicarboxylate, dimethyl hexanedicarboxylate, dimethyl octanedicarboxylate, diethyl octanedicarboxylate, propylene glycol diacetate or ethylene glycol diacetate.

Of course, a mixture of different diesters is also possible. It is particularly preferably a mixture of different diesters of the general formula $H_3COOC—R^{8'}—COOCH_3$, where $R^{8'}$ is a divalent linear hydrocarbon radical having 2 to 6 carbon atoms, in particular $—(CH_2)_2—$, $—(CH_2)_4—$ and $—(CH_2)_6—$. Such ester mixtures are also commercially available.

Optionally, the radicals $R^7$ or $R^{7'}$ and $R^8$ may have even further substituents, in particular those selected from the group consisting of —F, —Cl, —Br, —OH or ═O and/or optionally nonneighboring carbon atoms in the radicals may be replaced by oxygen atoms. If appropriate, the person skilled in the art makes a suitable choice based on the type and number of such substituents, according to the desired properties of the cleaning agent.

Component (A6) is an ether alcohol of the general formula $R^9O—(—R^{10}—O)_nH$. Here, n is a natural number from 2 to 5, preferably 2 or 3. $R^9$ is H or a straight-chain or branched alkyl radical having 1 to 6 carbon atoms, such as, for example, methyl, ethyl, 1-propyl, 2-propyl, 1-butyl, 2-butyl, tert-butyl, 1-pentyl or 1-hexyl radicals. $R^{10}$ are straight-chain or branched alkylene radicals having 2 to 4 carbon atoms, in particular 1,2-ethylene, 1,3-propylene, 1,2-propylene, 1,2-butylene or 1,4-butylene radicals. The radicals $R^{10}$ in an ether alcohol may be identical or different. Of course, mixtures of different ether alcohols of said formula may also be used.

$R^{10}$ is preferably a propylene radical. A particularly preferred embodiment comprises dipropylene glycol monomethyl ether. Dipropylene glycol monomethyl ether and isomer mixtures thereof are commercially available.

The person skilled in the art makes a suitable choice from among the components A1 to A6, according to the desired properties of the cleaning agent, with the proviso that the components (A1) to (A6) each have a boiling point in the range from 150° C. to 300° C. The preferred boiling range is from 160 to 280° C. and particularly preferably from 170 to 250° C.

Common to the components (A1) to (A6) is the fact that, owing to the functional groups in the molecules, they have a certain degree of hydrophilicity without being particularly strongly hydrophilic. Owing to this property, the compounds do not swell hydrophobic relief layers to a substantial extent. However, residues of the cleaning agent can nevertheless be washed off the surface with water after the cleaning process. They are nevertheless sufficiently hydrophobic to be able to wash off the degradation products of the layer from the surface of the relief printing plate.

The components (A1) to (A6) furthermore have no long, hydrophobic alkyl radicals having more than 12 carbon atoms. Such long alkyl radicals generally have a high plasticizing effect on relief layers and lead to undesired losses of hardness. This is avoided by the use, according to the invention, of the components (A1) to (A6).

The desired degree of hydrophilicity can be established by the person skilled in the art through the choice of the type and amount of the components (A1) to (A6). As a rule, the cleaning agent should be substantially immiscible with water but should be sufficiently hydrophilic to be capable of being washed off the surface of the flexographic printing plate with water.

According to the invention, the cleaning agent comprises at least 50% by weight of one or more components (A) selected from the group consisting of (A1) to (A6), based on the amount of all components of the cleaning agent. The cleaning agent preferably comprises at least 70% by weight and particularly preferably at least 80% by weight of the components A1 to A6.

In a preferred embodiment of the invention, the cleaning agent consists of a mixture of at least two of the components A1 to A6.

A mixture of from 50 to 99% by weight of one or more components selected from the group consisting of A1, A2, A3, A4 and A5 and from 1 to 50% by weight of at least one compound A6 has proven particularly useful here.

In such a mixture, the amount of the components A1 to A5 is preferably from 55 to 95% by weight and very particularly preferably from 60 to 90% by weight. The amount of component A6 is preferably from 5 to 45% by weight and very particularly preferably from 10 to 40% by weight.

A mixture of one or more compounds of the components A5 and A6 is particularly preferred.

In addition to the components A1 to A6, the cleaning agent can optionally also comprise one or more assistants (B).

The assistants may be, for example, surfactants, emulsifiers, antistatic agents, antifoams, dyes or compatibilizers. The cleaning agent preferably comprises at least one surfactant. Examples of suitable surfactants include fatty alcohol polyglycol ethers, salts of fatty alcohol polyglycol ethersulfonic acids, fatty alcohol polyglycol ethercarboxylic acids and esters of mono- and dicarboxylic acids, which esters contain ethoxy groups.

The type and amount of assistants (B) is established by the person skilled in the art according to the desired properties of the cleaning agent. However, the amount should as a rule not exceed 15% by weight, preferably 10 and particularly preferably 5% by weight, based on the amount of all components of the cleaning agent.

Furthermore, the cleaning agent according to the invention may also comprise further solvents (C) differing from the components A1 to A6. These may be used in particular for the fine adjustment of the properties of the cleaning agent. Such additional solvents should preferably also have a boiling range from 150 to 300° C., preferably from 160° C. to 280° C. Examples include high-boiling alcohols or glycols, such as, for example, cyclohexanol, methylcyclohexanol, trimethylcyclohexanol, benzyl alcohol, $C_7$-$C_{12}$-alcohols, terpene alcohols, propylene glycol, dipropylene glycol or propylheptanol, high-boiling hydrocarbons, such as, for example, dearomatized mineral oil fractions having a boiling range from 150° C. to 300° C., hydrogenated aromatic hydrocarbons, diisopropylbenzene or terpenes and N-methylpyrrolidone.

The type and amount of additional solvents (C) is established by the person skilled in the art according to the desired properties of the cleaning agent. However, the amount should as a rule not exceed 20% by weight, preferably 15 and particularly preferably 10% by weight, based on the amount of all components of the cleaning agent.

The cleaning agent can be prepared by simple mixing of the components.

The preparation can be carried out, for example, by an end user himself, such as a printing works or process engraver, on site. However, the preparation can also be carried out by a third party.

The cleaning of the printing plate in process step (2) can be effected, for example, by simple immersion or spraying of the relief printing plate with the cleaning agent.

However, it can also preferably be supported by mechanical means, such as, for example, by brushes and/or plush pads. Brush washers, which are customary for the development of photopolymerizable flexographic printing elements, can particularly preferably be used for the cleaning step.

In the case of flexographic printing plates, it is possible to use, for example, a continuous system which has rotating round brushes, movable flat brushes or plush pads.

In the case of seamless sleeves or plates already mounted on cylindrical substrates, washout apparatuses which have at least one holding apparatus for the round printing plate and at least one rotating brush whose distance from the round printing plate is preferably adjustable have proven useful. The apparatuses may also have additional components for drying, such as, for example, a rotating brush, an air squeegee, a squeeze roll or the like. The holder for the round printing plate may itself also consist of brushes in whose gap the round printing plate is placed and is driven at different rotational speeds/in different directions of rotation. The round printing plate can be held down by its own weight or by means of an additional roll.

With the use of spray washers, the cleaning process can also be supported by spraying the cleaning agent onto the surface of the engraved flexographic printing plate under high pressure.

The contact time with the cleaning agent should not exceed 15 minutes, preferably 10 minutes, and the contact time is particularly preferably from 2 to 8 minutes.

Before use, it is as a rule advisable to remove any remaining residues of the cleaning agent from the surface of the cleaned flexographic printing plate. Owing to the low tendency to swelling, time-consuming drying processes are, however, superfluous. The drying process lasts as a rule for not more than 30 minutes, preferably not more than 20 minutes and particularly preferably not more than 10 minutes.

The removal can be effected, for example, by simply dabbing with an absorptive material, such as, for example, fabric or paper, or by simply drying in air at room temperature or elevated temperatures up to about 65° C. with or without air exchange. In the case of a round printing plate, the residues of the cleaning agent can also be removed by rapid rotation, the cleaning agent residues being thrown off. Furthermore, brushes, air squeegees and/or squeeze rolls may also be used.

The process according to the invention can of course also comprise further process steps.

In particular, the process may comprise further cleaning steps. For example, residues of dust or the like immediately after the engraving can be removed by blowing off with compressed air or brushing off.

In a further cleaning step, water or an aqueous cleaning agent is particularly advantageously used. The step can be effected before step (2) and preferably after step (2). By means of a washing step following (2), the residues of the liquid cleaning agent used according to the invention are particularly advantageously removed.

Aqueous cleaning agents for a further cleaning step (3) substantially comprise water and optionally small amounts of alcohols and/or assistants, such as, for example, surfactants, emulsifiers, dispersants or bases. Preferably, only water is used. The residues of water or of the aqueous cleaning agent can then be removed, for example, by simply blowing off the surface with compressed air.

The cleaning agent used according to the invention and comprising carboxylic esters and ether alcohols has only little swelling activity so that no tedious drying of the printing plate is required. Firstly, it has a very good cleaning effect with regard to organic impurities on the surface but can nevertheless be washed off the surface of the printing plate with water.

Additional layer thickness tolerances, as occur with the use of conventional cleaning agents owing to swelling and drying, can be effectively avoided. This leads to more uniform ink transfer and hence to a higher-quality printed copy.

By means of the direct laser engraving process according to the invention with the use of cleaning agents, a ready-to-use flexographic printing plate is obtained immediately after the cleaning. The processing time is thus substantially shorter compared with the use of conventional cleaning agents.

The examples which follow are intended to explain the invention in more detail.

GENERAL METHODS

Production of the Unamplified Flexographic Printing Elements

The production of the flexographic printing elements used for the process according to the invention is effected by the conventional process. In the examples which follow, the photopolymerizable material was extruded, discharged through a flat-sheet die and calendered between a substrate and a release element. This process is described in detail in EP-B 084 851.

In the examples described below, the release element consisted of a silicone-coated 125 μm thick PET cover sheet.

The extrusion unit used was a twin-screw extruder (ZSK 53, Werner & Pfleiderer), at a throughput of 30 kg/h. The calendering was effected between two calender rolls heated at 90° C., the substrate film being fed over the upper calender roll and the release element over the lower calender roll.

The sandwich composite obtained was transported via a suction belt, cooled and made up.

Details of the composition of the photopolymerizable material, production parameters and the substrate and release elements used are described in the respective examples.

Photochemical Amplification of the Flexographic Printing Elements

The photochemical amplification of the flexographic printing elements is effected by irradiation of the unamplified flexographic printing element by means of long-wave UV light (UVA) through the release element. The UV dose used in the case of a flexographic printing element having a thickness of 1.4 mm is about 12 J/cm$^2$. After removal of the release element, the relief layer is rendered nontacky with the aid of short-wave UV light (UVC).

Laser Engraving of the Amplified Flexographic Printing Elements

The amplified flexographic printing elements were laser-engraved with the aid of a 3-beam $CO_2$ laser (BDE 4131, from Stork Prints Austria) with a test motif at a resolution of 1270 dpi. The parameters used were:

| | |
|---|---|
| Surface speed: | 10 m/s |
| Relief height: | 550 μm |
| Flank angle: | 59° |
| First step: | 60 μm |

The test motif contains test elements relevant for flexographic printing, such as fine positive and negative lines (line width from 60 μm to 1 mm) and dots (diameter from 60 μm to 1 mm), screens (1-99% at 100 and 133 lpi), fine characters, a grid (line width 60 μm) and a chessboard pattern having an edge length of 500 μm.

Cleaning of the Laser-engraved Flexographic Printing Elements

The cleaning of the laser-engraved flexographic printing elements was effected with the aid of a commercial flat brush washer (W 32×40, BASF Drucksysteme GmbH) for the stated cleaning time with the respective cleaning agent.

Starting Materials Used

| | |
|---|---|
| KRATON ® D-1102: | SBS block copolymer (Kraton Polymers) $M_w$ ≈ 125 000 g/mol, 17% SB two-block fraction 30% styrene units, 63% 1,4-butadiene units, 7% 1,2-butadiene units |
| Nisso ® PB B-1000: | Oligomeric polybutadiene oil (Nippon Soda) |
| Ondina ® 934: | Medical white oil (Shell Chemicals) |
| Laromer ® HDDA: | 1,6-Hexanediol diacrylate (BASF) |
| Irgacure ® 651: | Benzil dimethyl ketal (Ciba Specialty Chemicals) |
| Kerobit ® TBK: | 2,6-Di-tert-butyl-p-cresol (Raschig) |
| Butyrolactone: | Butyrolactone (BASF) |
| Starsol ®: | Commercial mixture of dimethyl succinate, dimethyl glutarate and dimethyl adipate (dibasic ester mixture) |
| Solvenon ® DPM: | Dipropylene glycol monomethyl ether, isomer mixture (BASF) |

EXAMPLE 1

First an unamplified flexographic printing element was produced analogously to WO 03/106172 in a total thickness of 1.29 mm, including release element, by the extrusion process described above. The relief layer had the following composition:

| Components | Starting materials | | % by weight |
|---|---|---|---|
| Binder | KRATON ® | D-1102 | 56.96 |
| Plasticizer | NISSO ® | PB B-1000 | 15.00 |
| | Ondina ® | G 34 | 15.00 |
| Monomers | Laromer ® | HDDA | 10.00 |
| Photoinitiator | Irgacure ® | 651 | 2.00 |
| Additives | Kerobit ® | TBK | 1.00 |
| | Dye | | 0.04 |

The unamplified flexographic printing element thus produced was photochemically amplified as described above and laser-engraved with the test motif.

As is evident in FIG. 1, the flexographic printing plate had considerable deposits both on the surface and on the flanks. The tacky deposits built up to a greater extent on the flanks; this would lead to a blurred printed image during printing.

EXAMPLE 2

A cleaning agent according to the invention was prepared from 80 parts by weight of butyrolactone and 20 parts by weight of Solvenon® DPM by thorough mixing. A laser-engraved flexographic printing element analogous to example 1 which had not been cleaned was cleaned for 1 minute in a brush washer with this cleaning mixture and blown dry with the aid of compressed air.

The increase in layer thickness was only 3 μm.

Figure 2:
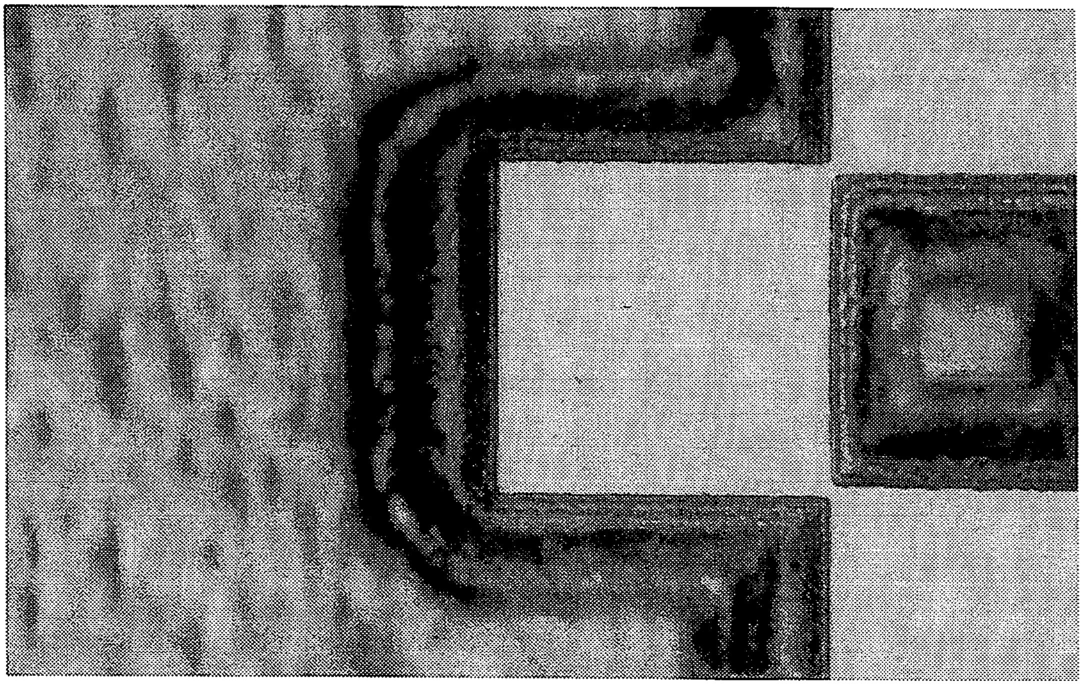

As is evident from FIG. 2, the impurities both on the surface and on the flanks were virtually completely removed. The cleaned printing plate can be used for flexographic printing, without a blurred printed image being obtained.

EXAMPLE 3

A laser-engraved flexographic printing element analogous to example 1 which had not been cleaned was cleaned for 5 minutes in a brush washer with the cleaning mixture according to the invention from example 2 and blown dry with the aid of compressed air.

The increase in layer thickness was only 4 μm.

Figure 3:
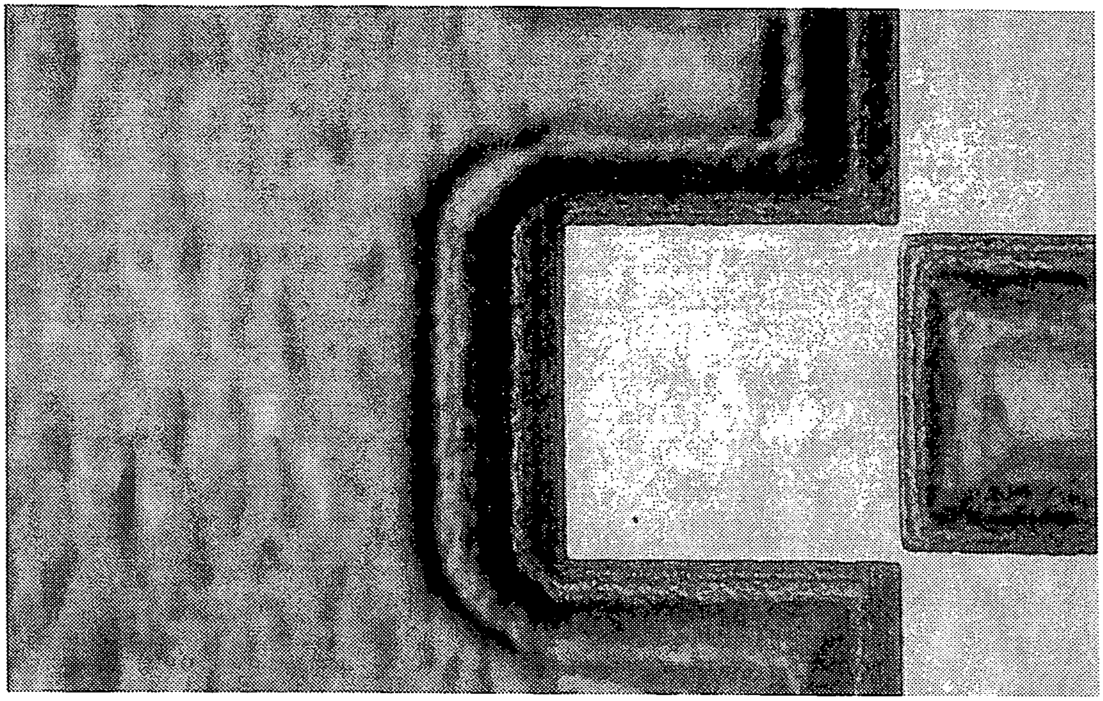

As is evident from FIG. 3, the impurities both on the surface and on the flanks were completely removed. The cleaned printing plate was used for flexographic printing, without a blurred printed image being obtained.

EXAMPLE 4

A cleaning agent according to the invention was prepared from 80 parts by weight of Starsol® and 20 parts by weight of Solvenon DPM by thorough mixing. A laser-engraved flexographic printing element analogous to example 1 which had not been cleaned was cleaned for 5 minutes in a brush washer with this cleaning mixture, then washed with water for 2 minutes and blown dry with the aid of compressed air. The cleaning agent could be removed readily from the surface of the flexographic printing element by washing with water.

The increase in layer thickness was only 17 μm.

Figure 4:
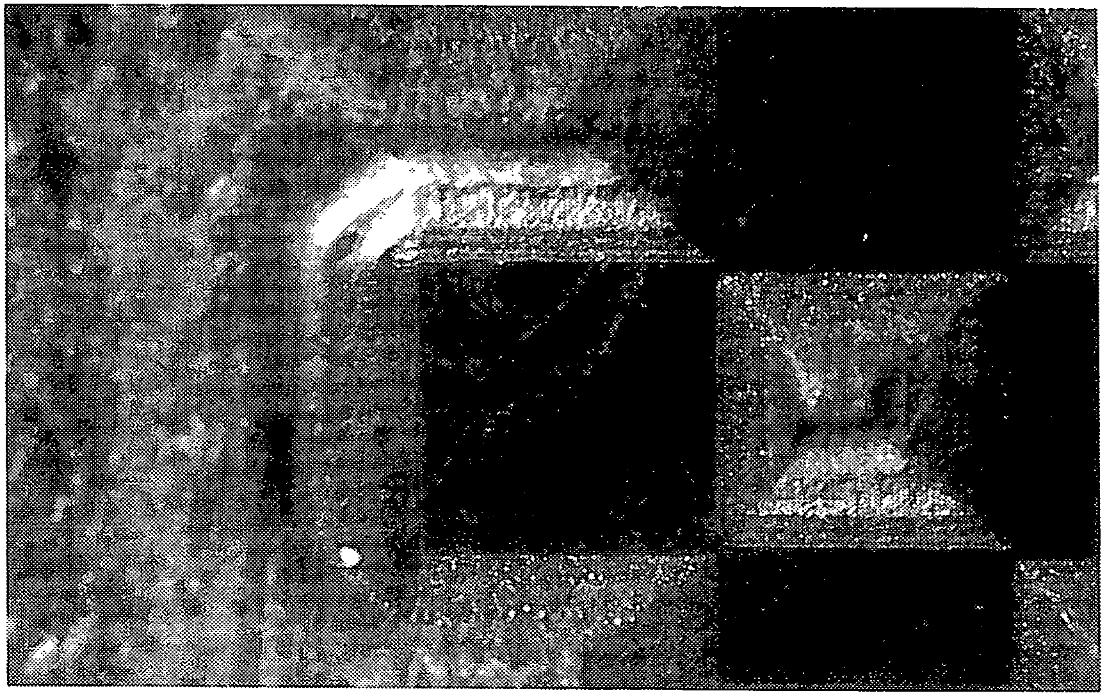

As is evident from FIG. 4, the impurities both on the surface and on the flanks were removed for the most part. The cleaned printing plate can be used for flexographic printing, without a blurred printed image being obtained.

EXAMPLE 5

Comparative Example

For comparison, a microemulsion cleaning agent according to WO 99/62723 was prepared from the following components: rapeseed oil methyl ester, water, emulsifiers and assistants. A laser-engraved flexographic printing element analogous to example 1 which had not been cleaned was cleaned for 5 minutes in a brush washer with the microemulsion cleaning agent, then washed with water for 2 minutes and blown dry with the aid of compressed air. The cleaning agent could be readily removed from the surface of the flexographic printing element by washing with water.

The increase in layer thickness was 28 μm.

Figure 5:
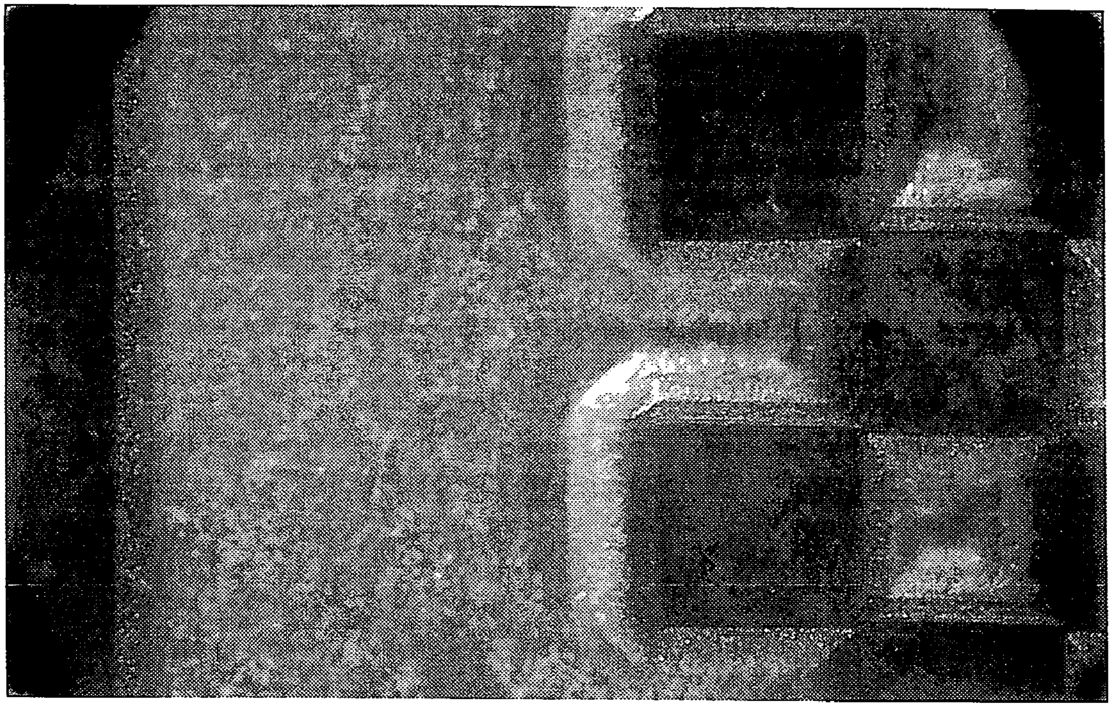

As is evident from FIG. 5, the impurities on the surface were predominantly removed, but those on the flanks are still clearly present. On use in flexographic printing, a blurred printed image will be obtained since impurities at the edges can also print due to the squeezing of the printing plate.

EXAMPLE 6

Comparative Example

For comparison, a laser-engraved flexographic printing element analogous to example 1 which had not been cleaned was cleaned for 5 minutes in a brush washer with tap water and blown dry with the aid of compressed air.

A increase in the layer thickness was not found.

Figure 6:
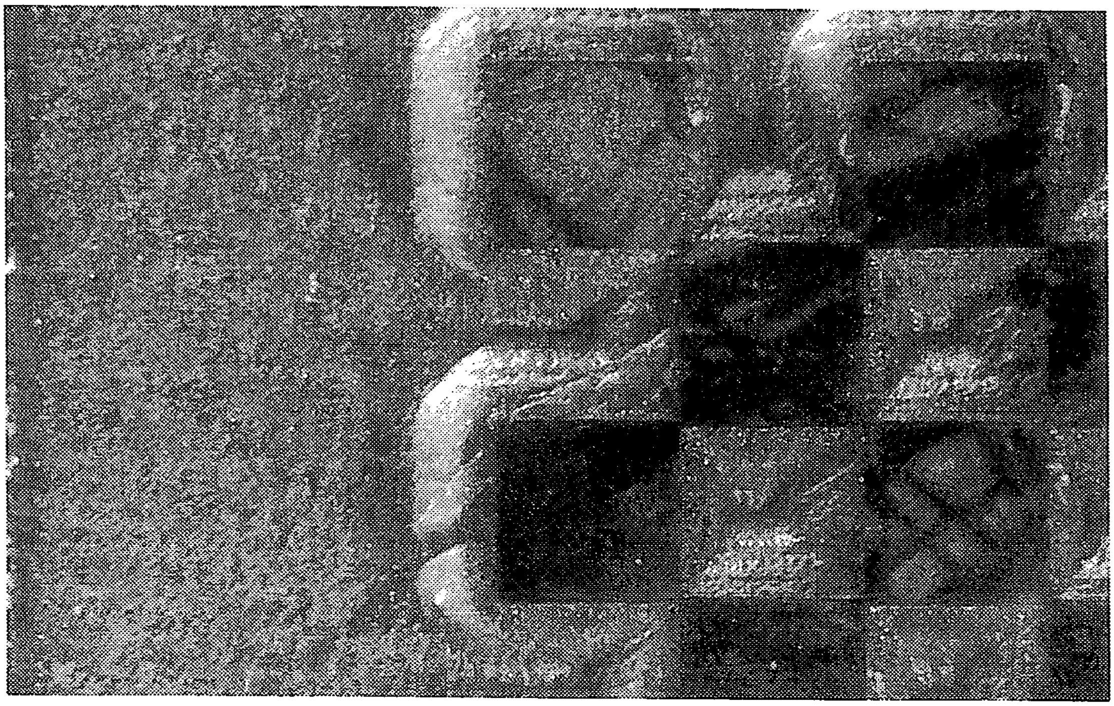

As is evident from FIG. 6, a part of the particulate impurities was detached purely mechanically only on the surface. The tacky deposits on the flanks are still completely present. The flexographic printing plate cleaned in this manner is unsuitable for flexographic printing.

EXAMPLE 7

Comparative Example

For comparison, a conventional washout agent for flexographic printing plates (nylosolv A, BASF Drucksysteme GmbH) was used. A laser-engraved flexographic printing element analogous to example 1 which had not been cleaned was cleaned for 3 minutes in a brush washer with nylosolv A and blown dry with the aid of compressed air.

The increase in layer thickness was 46 μm.

Owing to the large increases in layer thickness, it was first necessary to dry the cleaned flexographic printing element in a time consuming manner before use in flexographic printing.

LIST OF FIGURES

FIG. 1: Laser-engraved flexographic printing element according to example 1 (not cleaned)

FIG. 2: Laser-engraved flexographic printing element according to example 2, cleaned for 1 min with BL/DPM 8:2

FIG. 3: Laser-engraved flexographic printing element according to example 3, cleaned for 5 min with BL/DPM 8:2

FIG. 4: Laser-engraved flexographic printing element according to example 4, cleaned for 5 min with Starsolv/DPM 8:2

FIG. 5: Laser-engraved flexographic printing element according to example 5, cleaned for 5 min with Printclean classic FIG. 6: Laser-engraved flexographic printing element according to example 6, cleaned for 5 min with water

We claim:

1. A process for the production of flexographic printing plates which comprises a means of direct laser engraving, in which the starting material used is a laser-engravable flexographic printing element, at least comprising a dimensionally stable substrate and an elastomeric, relief forming layer having a thickness of at least 0.2 mm, and which process comprises at least the following steps:

(1) engraving of a printing relief in the relief-forming layer with the aid of a laser, the height of the relief elements to be engraved by means of the laser being at least 0.03 mm, and (2) cleaning of the resulting printing plate by means of a liquid cleaning agent, wherein the cleaning agent comprises at least 50% by weight, based on the amount of all components of the cleaning agent, of one or more components (A) selected from the group consisting of (A1) lactones having 5, 6 or 7-membered rings, (A2) hydroxymonocarboxylic esters of the general formula $R^1$—COO—$R^2$, where $R^1$ and $R^2$, independently of one another, are a linear or branched alkyl, aralkyl, aryl or alkylaryl radical having 1 to 12 carbon atoms and at least one of the radicals $R^1$ or $R^2$ is substituted by at least one OH group, with the proviso that the esters have 5 to 20 carbon atoms, (A3) alkoxymonocarboxylic esters of the general formula $R^3$—COO—$R^4$, where $R^3$ and $R^4$, independently of one another, are a linear or branched alkyl, aralkyl or alkylaryl radical having 1 to 12 carbon atoms, and in which one or more, nonneighboring, nonterminal aliphatic carbon atoms in at least one of the radicals are replaced by an oxygen atom and the remainder can also have a terminal OH group, with the proviso that the esters have 5 to 20 carbon atoms, (A4) ketomonocarboxylic esters of the general formula R5-COO—R6, where R5 and R6, independently of one another, are a linear or branched alkyl, aralkyl or alkylaryl radical having 1 to 12 carbon atoms, and in which one or more, nonneighboring, nonterminal aliphatic carbon atoms in at least one of the radicals are replaced by a keto group >C═O, with the proviso that the esters have 5 to 20 carbon atoms, (A5) dicarboxylic esters of the general formula R7OOC—R8-COOR7 and/or R7COO—R8-OOCR7', where R7 and R7', independently of one another, are linear or branched alkyl radicals having 1 to 4 carbon atoms and R4 is a divalent hydrocarbon radical having 2 to 12 carbon atoms, with the proviso that the esters have 6 to 20 carbon atoms, and where the radicals R7 or R7' and R8 are optionally further substituted with substituents selected from the group consisting of F, Cl, Br, OH and ═O and/or nonneighboring carbon atoms in the radicals may optionally be replaced by oxygen atoms, and (A6) ether alcohols of the general formula $R^9O$—(—$R^{10}$—$O)_n$H, where n is a natural number from 2 to 5, $R^9$ is H or a straight-chain or branched alkyl radical having 1 to 6 carbon atoms and $R^{10}$ are identical or different alkylene radicals having 2 to 4 carbon atoms, with the proviso that the components (A1) to (A6) each have a boiling point in the range from 150° C. to 300° C.

2. The process according to claim 1, wherein the cleaning agent comprises at least one assistant (B).

3. The process according to claim 2, wherein at least one of the assistant (B) is a surfactant.

4. The process according to claim 1, wherein the cleaning agent comprises at least one further solvent (C) which differs from the components A1 to A6 and has a boiling point in the range from 1500 C. to 3000 C.

5. The process according to claim 4, wherein the additional solvent (C) is present in an amount of not more than 25% by weight, based on the amount of all components.

6. The process according to claim 1, wherein the cleaning agent comprises from 50 to 99% by weight of one or more components selected from the group consisting of A1, A2, A3, A4 and A5 and from 1 to 50% by weight of at least one compound A6.

7. The process according to claim 6, wherein it is a mixture of component A5 and component A6.

8. The process according to claim 1, wherein $R^1$ and R2, independently of one another, are linear or branched alkyl radicals having 1 to 6 carbon atoms.

9. The process according to claim 1, wherein R8 is a divalent linear alkylene radical having 2 to 6 carbon atoms.

10. The process according to claim 1, wherein component (A5) is a mixture of different diesters of the general formula H3COOC—R8-COOCH3, where R8 is a divalent linear hydrocarbon radical having 2 to 6 carbon atoms.

11. The process according to claim 1, wherein R10 is a propylene radical.

12. The process according to claim 1, wherein the component (A6) is dipropylene glycol monomethyl ether.

13. The process according to claim 1, wherein the cleaning is carried out using a brush washer.

14. The process according to claim 1, wherein the cleaning is carried out by spraying the cleaning agent onto the printing plate surface under high pressure.

15. The process according to claim 1, wherein the residues of the liquid cleaning agent are removed in a subsequent process step with water or with an aqueous cleaning agent.

* * * * *